United States Patent
Li et al.

(10) Patent No.: US 7,076,768 B2
(45) Date of Patent: Jul. 11, 2006

(54) DYNAMIC CLASS PACKAGING

(75) Inventors: Chia-Hsin Li, San Jose, CA (US);
Brian Chan, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 762 days.

(21) Appl. No.: 10/001,085

(22) Filed: Oct. 31, 2001

(65) Prior Publication Data
US 2003/0101445 A1    May 29, 2003

(51) Int. Cl.
*G06F 9/44* (2006.01)
(52) U.S. Cl. .................. 717/132; 717/144; 717/166
(58) Field of Classification Search ........ 717/110–121, 717/124–133, 154–157, 172, 177, 144, 166, 717/178
See application file for complete search history.

(56) References Cited

U.S. PATENT DOCUMENTS

| | | |
|---|---|---|
| 4,864,569 A | 9/1989 | DeLucia et al. |
| 5,485,601 A | 1/1996 | Ching |
| 5,500,941 A | 3/1996 | Gil |
| 5,555,416 A | 9/1996 | Owens et al. |
| 5,732,275 A | 3/1998 | Kullick et al. |
| 5,754,858 A | 5/1998 | Broman et al. |
| 5,790,796 A | 8/1998 | Sadowsky |
| 5,805,891 A | 9/1998 | Bizuneh et al. |
| 5,974,454 A | 10/1999 | Apfel et al. |
| 6,023,586 A | 2/2000 | Gaisford et al. |
| 6,067,582 A | 5/2000 | Smith et al. |
| 6,131,192 A | 10/2000 | Henry |
| 6,154,680 A | 11/2000 | White et al. |

OTHER PUBLICATIONS

Tip et al., "Practical Experience with an Application Extractor for Java", ACM, pagers: 292-305, 1999.*
Bradley et al., "JAZZ: an Efficient Compressed Format for Java Archive Files", ACM, pp. 1-9, 1998.*

* cited by examiner

*Primary Examiner*—Ted T. Vo

(57) ABSTRACT

Methods and computer readable media for a software tool capable of subdividing programs into autonomous modules, where the modules enable a feature of the program, are provided. One exemplary method includes a computer implemented method for identifying modules of an executable program. The method begins with initiating the executable program. Then, the executable program is monitored as it is running. The monitoring of the executable program further includes, identifying interrelated classes for each of the modules where each of the modules correspond to a feature functionality of the executable program. Also included in the monitoring is generating a data structure for each module as the executable program is running. Here, the data structure defines the classes for each feature functionality.

30 Claims, 15 Drawing Sheets

```
Dynamic Application Packaging Tool.                                          _ | □ | x |
File  Project
Project loaded successfully...
[APP_CLASS=webapps.webprint.app.WebPrintAppManager, ZIP_INFO=[epal.compman.zipper.ProjectZipInfo@1b8738], APP_CLASS_DIR=classes, CLAS
Starting application...
CLASS:[X:\WebProjects\WebPrint20\Java Editor\classes\webapps\webprint\app\WebPrintAppManager.class] loaded.
CLASS:[X:\WebProjects\WebPrint20\Java Editor\classes\webapps\webprint\app\WebPrintSplashWindow.class] loaded.
CLASS:[X:\WebProjects\WebPrint20\Java Editor\classes\webapps\webprint\app\WebPrintApp.class] loaded.
CLASS:[X:\WebProjects\WebPrint20\Java Editor\classes\epal\util\serialization\EPALSerializable.class] loaded.
CLASS:[X:\WebProjects\WebPrint20\Java Editor\classes\epal\renderbox\RenderBoxModel.class] loaded.
CLASS:[X:\WebProjects\WebPrint20\Java Editor\classes\webapps\webprint\app\renderbox\WebPrintRenderBoxModel.class] loaded.
CLASS:[X:\WebProjects\WebPrint20\Java Editor\classes\epal\util\PackageResourceBundle.class] loaded.
java.io.FileNotFoundException: X:\WebProjects\WebPrint20\Java Editor\classes\webapps\webprint\app\appRB_en_US.class
not found: webapps.webprint.app.appRB_en_US
java.io.FileNotFoundException: X:\WebProjects\WebPrint20\Java Editor\classes\webapps\webprint\app\appRB_en.class
not found: webapps.webprint.app.appRB_en
java.io.FileNotFoundException: X:\WebProjects\WebPrint20\Java Editor\classes\webapps\webprint\app\appRB_en_US.class
not found: webapps.webprint.app.appRB_en_US
java.io.FileNotFoundException: X:\WebProjects\WebPrint20\Java Editor\classes\webapps\webprint\app\appRB_en.class
not found: webapps.webprint.app.appRB_en
java.io.FileNotFoundException: X:\WebProjects\WebPrint20\Java Editor\classes\webapps\webprint\app\appRB.class
not found: webapps.webprint.app.appRB
RES:[X:\WebProjects\WebPrint20\Java Editor\classes\webapps\webprint\app\appRB.properties] loaded.
CLASS:[X:\WebProjects\WebPrint20\Java Editor\classes\webapps\webprint\app\WebPrintAppSettings.class] loaded.
CLASS:[X:\WebProjects\WebPrint20\Java Editor\classes\epal\renderbox\UndoManager.class] loaded.
CLASS:[X:\WebProjects\WebPrint20\Java Editor\classes\webapps\webprint\app\WebPrintAppLoader.class] loaded.
CLASS:[X:\WebProjects\WebPrint20\Java Editor\classes\epal\renderbox\ROModel.class] loaded.
CLASS:[X:\WebProjects\WebPrint20\Java Editor\classes\epal\renderbox\model\RectangleModel.class] loaded.
CLASS:[X:\WebProjects\WebPrint20\Java Editor\classes\epal\renderbox\model\text\TextModel.class] loaded.
CLASS:[X:\WebProjects\WebPrint20\Java Editor\classes\webapps\webprint\app\renderbox\WebPrintTextModel.class] loaded.
CLASS:[X:\WebProjects\WebPrint20\Java Editor\classes\webapps\webprint\app\exception\CanNotFindPrinterException.class] loaded.
CLASS:[X:\WebProjects\WebPrint20\Java Editor\classes\epal\renderbox\RenderBox.class] loaded.
CLASS:[X:\WebProjects\WebPrint20\Java Editor\classes\epal\renderbox\workarea\WorkingRenderBox.class] loaded.
CLASS:[X:\WebProjects\WebPrint20\Java Editor\classes\webapps\webprint\app\status\StatusListener.class] loaded.
CLASS:[X:\WebProjects\WebPrint20\Java Editor\classes\webapps\webprint\app\renderbox\WebPrintWorkingRenderBox.class] loaded.
CLASS:[X:\WebProjects\WebPrint20\Java Editor\classes\epal\awt\dialog\YesNoDialog.class] loaded.
CLASS:[X:\WebProjects\WebPrint20\Java Editor\classes\epal\awt\dialog\MessageBox.class] loaded.
CLASS:[X:\WebProjects\WebPrint20\Java Editor\classes\webapps\webprint\app\WebPrintEpdPrinter.class] loaded.
CLASS:[X:\WebProjects\WebPrint20\Java Editor\classes\epal\util\EpalUtility.class] loaded.
CLASS:[X:\WebProjects\WebPrint20\Java Editor\classes\webapps\webprint\app\MainPanel.class] loaded.
                                    •
                                    •
                                    •
RES:[X:\WebProjects\WebPrint20\Java Editor\classes\webapps\webprint\app\buttons\images\YellowFlower.gif] loaded.
CLASS:[X:\WebProjects\WebPrint20\Java Editor\classes\webapps\webprint\app\StepPanel.class] loaded.
CLASS:[X:\WebProjects\WebPrint20\Java Editor\classes\epal\awt\panel\DBufferPanel.class] loaded.
CLASS:[X:\WebProjects\WebPrint20\Java Editor\classes\epal\awt\panel\BorderPanel.class] loaded.
CLASS:[X:\WebProjects\WebPrint20\Java Editor\classes\webapps\webprint\app\EditPanel.class] loaded.
CLASS:[X:\WebProjects\WebPrint20\Java Editor\classes\webapps\webprint\app\NavigationBar.class] loaded.
CLASS:[X:\WebProjects\WebPrint20\Java Editor\classes\webapps\webprint\app\ObjectListPanel.class] loaded.
CLASS:[X:\WebProjects\WebPrint20\Java Editor\classes\epal\renderbox\ModelStateListener.class] loaded.
                                    •
                                    •
                                    •
```

Fig. 13

| Name | Name | Name |
|---|---|---|
| StepPanelButtonPressed.gif | WebPrintAppManager.class | DesignButtonEntered.gif |
| StepPanelButtonDisabled.gif | WebPrintSplashWindow.class | MainTopRightCorner.gif |
| StepPanelButtonEntered.gif | WebPrintApp.class | ScrollPanel.class |
| HelpButtonRaised.gif | EPALSerializable.class | EpalScrollbar.class |
| HelpButtonPressed.gif | RenderBoxModel.class | Viewport.class |
| WebPrintColor.class | WebPrintRenderBoxModel.class | ScrollPanelListener.class |
| MainTopLeftCornerLogo.gif | PackageResourceBundle.class | ScrollPanelLayout.class |
| StatusBar.class | appRB.properties | EpalButton.class |
| ToolPad.class | WebPrintAppSettings.class | ArrowButton.class |
| ToolPanelButton.class | UndoManager.class | ObjectRenderBox.class |
| ImageModel.class | WebPrintAppLoader.class | ObjectRenderBoxView.class |
| ShowGridButtonRaised.gif | ROModel.class | ImageReader.class |
| ShowGridButtonPressed.gif | RectangleModel.class | WebPrintImageReader.class |
| ShowGridButtonDisabled.gif | TextModel.class | JyptDecrypt.class |
| ShowGridButtonEntered.gif | WebPrintTextModel.class | PrinterInitializationException.class |
| HideGridButtonRaised.gif | CanNotFindPrinterException.class | WizardManager.class |
| HideGridButtonPressed.gif | RenderBox.class | WebPrintWizard.class |
| HideGridButtonDisabled.gif | WorkingRenderBox.class | ImageCustomer.class |
| HideGridButtonEntered.gif | StatusListener.class | WebPrintNetImageModel.class |
| GroupButtonRaised.gif | WebPrintWorkingRenderBox.class | wizardsRB.properties |
| GroupButtonPressed.gif | YesNoDialog.class | GreetingCardWizard.class |
| GroupButtonDisabled.gif | MessageBox.class | ROView.class |
| GroupButtonEntered.gif | WebPrintEpdiPrinter.class | StatusEvent.class |
| UngroupButtonRaised.gif | EpalUtility.class | ScrollPanelEvent.class |
| UngroupButtonPressed.gif | MainPanel.class | info.properties |
| UngroupButtonDisabled.gif | ButtonImageManager.class | |
| UngroupButtonEntered.gif | YellowFlower.gif | |
| MoveFwdButtonRaised.gif | StepPanel.class | |
| MoveFwdButtonPressed.gif | DBufferPanel.class | |
| MoveFwdButtonDisabled.gif | BorderPanel.class | |
| MoveFwdButtonEntered.gif | EditPanel.class | |
| MoveBackButtonRaised.gif | NavigationBar.class | |
| MoveBackButtonPressed.gif | ObjectListPanel.class | |
| MoveBackButtonDisabled.gif | ModelStateListener.class | |
| MoveBackButtonEntered.gif | RenderBoxModelListener.class | Fig. 14 |
| ZoomInButtonRaised.gif | ToolPanel.class | |
| ZoomInButtonPressed.gif | RenderBoxView.class | |
| ZoomInButtonDisabled.gif | WorkingView.class | |
| ZoomInButtonEntered.gif | ViewMap.class | |
| ZoomOutButtonRaised.gif | ViewRatioMap.class | |
| ZoomOutButtonPressed.gif | WorkingViewRatioMap.class | |
| ZoomOutButtonDisabled.gif | ViewGraphics.class | |
| ZoomOutButtonEntered.gif | GroupModel.class | |
| RotationButtonRaised.gif | WebPrintWorkingView.class | |
| RotationButtonPressed.gif | RenderBoxModelEvent.class | |
| RotationButtonDisabled.gif | ROClassManager.class | |
| RotationButtonEntered.gif | ROClassGroup.class | |
| UndoButtonRaised.gif | AppStatusManager.class | |
| UndoButtonPressed.gif | StatusManager.class | |
| UndoButtonDisabled.gif | StatusValue.class | |
| UndoButtonEntered.gif | StatusEventQueue.class | |
| RemoveButtonRaised.gif | ImagePanel.class | |
| RemoveButtonPressed.gif | EpalButtonLW.class | |
| RemoveButtonDisabled.gif | ImageButtonLW.class | |
| RemoveButtonEntered.gif | StepPanelButton.class | |
| DesignButtonRaised.gif | SemiOvalImageButton.class | |
| DesignButtonPressed.gif | EPALSerializationException.class | |
| DesignButtonDisabled.gif | StepPanelButtonRaised.gif | |

DYNAMIC CLASS PACKAGING

CROSS REFERENCE TO RELATED APPLICATIONS

This application is related to U.S. patent application Ser. No. 09/999,658, filed on the same day as the instant application and entitled "DYNAMIC JAVA CLASS LOADING FOR APPLICATION EXECUTION." This application is hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to methods and apparatus for software tools for an executable program and more particularly for identifying modules and associating classes with each of the modules of the executable program.

2. Description of the Related Art

Downloading applications via a distributed network, such as the Internet, offers many enticing advantages to both consumers and software companies. However, as the sophistication and the size of the applications increases, so to does the time required to download the applications. Unfortunately, a user with a dial up modem connection is essentially discouraged from downloading applications via the Internet because of the download time.

FIG. 1 illustrates block diagram 100 depicting the prior art manner of downloading an executable program from the Internet to run a Java application through a web browser such as Internet Explorer™ or Netscape Navigator™. Server 102 has a hyper text mark-up language (HTML) page 104. The HTML page 104 is downloaded to the client 108 through a web browser 110 via the Internet 106. An ActiveX control is included in the web browser or downloaded to the client 108. The ActiveX control includes the Object linking and embedding (OLE) control (OCX) 114, a zip file 116 which includes Java programs and class files and an .inf file which provides the system with the necessary information to install the OCX 114 and the zip file 116. The ActiveX 112 control executes the Java programs from the zip file 116. The OCX, Zip file and .inf files are packaged in a .cab file. Accordingly, the ActiveX installs the .cab file and decompress the zip file and run the different Java applications through the web browser.

The impediments imposed by the prior art method of downloading the application, as described with reference to FIG. 1, are responsible for discouraging users from downloading applications over the Internet. For example, a typical .cab file would take approximately over five minutes to download and install using a 56K dial-up modem. Furthermore, the entire .cab file must be downloaded prior to the application being run. As the zip file contains all the classes for the Java application, the user must wait for all the classes to be downloaded even if the user does not use some of the classes. This wait time becomes longer as the functionality of the software is enhanced or more features are added since the .cab file grows larger.

While the problem exists with initial downloads of applications, it also extends to modifications to current applications. For example, if a 1 Kilobyte modification is made to an existing program for a new revision or an update, then the user will have to download the complete application or receive a disk with the revised application. In an effort to contain costs, companies are encouraging users to download files over the Internet rather than shipping compact discs (CD) or floppy disks for new or revised applications. Since the costs associated with the CD or floppy is ultimately passed on to the consumer, it would also benefit the consumer if an application could be conveniently downloaded through the Internet. Although there is the possibility to provide patches in some instances, the management of patches becomes unwieldy, thus preventing the use of patches for updates. Furthermore, patches fail to address the concerns relating to the initial downloading of the program.

Another contributing factor to the excessive time required to download an executable program from the Internet is the requirement that the entire program, including all feature functionality associated with the program, be downloaded. Because of the lack of tools available to subdivide an executable program into modules where it is known how each of the classes is used by the module, the entire application must be downloaded. It is prohibitively laborious to manually analyze a sophisticated code to map the interaction of the various classes and modules. As programs become more complex, manual analysis is further put out of reach simply because of the size of the program. Even a minor change in the code may require that a comprehensive manual analysis be undertaken once again. Furthermore, in order to attempt to manually analyze the program it is necessary to have the expertise of the author of the code available, a luxury often not available in the current fast paced environment.

As a result, there is a need to solve the problems of the prior art to provide a tool for associating classes in groups to create modules of the executable program capable of being independently downloaded via a distributed network such as the Internet.

SUMMARY OF THE INVENTION

Broadly speaking, the present invention fills these needs by providing a method and apparatus for a monitoring tool configured to record and subdivide an application into modules. It should be appreciated that the present invention can be implemented in numerous ways, including as a process, an apparatus, a system, or a device. Several inventive embodiments of the present invention are described below.

In one embodiment, a computer implemented method for identifying modules of an executable program is provided. The method begins with initiating the executable program. Then, the executable program is monitored as it is running. The monitoring of the executable program further includes, identifying interrelated classes for each of the modules where each of the modules correspond to a feature functionality of the executable program. Also included in the monitoring is generating a data structure for each module as the executable program is running. Here the data structure defines the classes for each feature functionality.

In another embodiment, a method for creating class graphs is provided where the class graphs identify how modules of an executable program use classes of the executable program. The method begins by monitoring the executable program as the program is being run. Next, each class associated with a core module is identified. The core module is configured to run an engine of the program. Then, each task associated with the program is executed while the program is being monitored. Next, each class used in the execution of each task is recorded. Then, a class graph is defined for the core module and each task, where each class graph defines a class interaction within the core module and each task.

In still another embodiment, a method for subdividing an executable program into autonomous class modules where each of the modules corresponds to a task is provided. The method begins by executing the program. Then, the execution of the program is monitored. Next, a record of classes used during execution of each task is maintained. Then, a class graph for each of the modules is defined, where the class graph represents an interaction of classes associated with each of the modules.

In yet another embodiment, a method for developing a software product for an application is provided. The application includes a plurality of features where each of the features is associated with at least one class. The method initiates with identifying each class of the application. Then, each of the features of the application is executed. Next, each class associated with each of the features is identified. Then, a module for each of the features is defined, where each module includes a group of classes identified to be associated with a particular feature. Here, each module is configured to enable functionality to operate the feature corresponding to the module In still yet another embodiment of the invention, a method for generating a module of an application program is provided. The module is configured to autonomously run a feature functionality of the application program. The method commences with the initiation of the application program. Then, a class loader to load a class is requested. Next, the class loader is monitored as each class of the module is loaded. Then, each class of the module is recorded. Next, an endpoint at which all the classes for the module have been loaded is detected. Then, the requesting, the monitoring, the recording and the detecting are repeated for the remaining modules of the application program.

In another embodiment, a computer readable media having program instruction for creating class graphs is provided. The class graphs identify how modules of an executable program use classes of the executable program. The computer readable media includes program instructions for monitoring the executable program as the program is being run. Also included are program instructions for identifying each class associated with a core module, where the core module is configured to run an engine of the program. The computer readable media includes program instructions for executing each task associated with the program while the program is being monitored. Program instructions for recording each class used in the execution of each task are included. Also included are program instructions for defining a class graph for the core module and each task, wherein each class graph defines a class interaction within the core module and each task.

The advantages of the present invention are numerous. Most notably, the monitoring tool allows for the subdividing of an executable program while the program is being executed. Additionally, the invention allows for taking a complex program and defining autonomous modules capable of providing a user access to functionality where the modules can be separately downloaded to the user's computer over a distributed network.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 13 illustrates an exemplary partial output of the monitoring program as an application is being executed in accordance with one embodiment of the invention.

FIG. 14 illustrates a partial list of exemplary classes and GIF files for the core module from a greeting card application captured by the monitoring program in accordance with one embodiment of the invention.

DETAILED DESCRIPTION OF THE PREFERRED EMBODIMENTS

Figure 1:
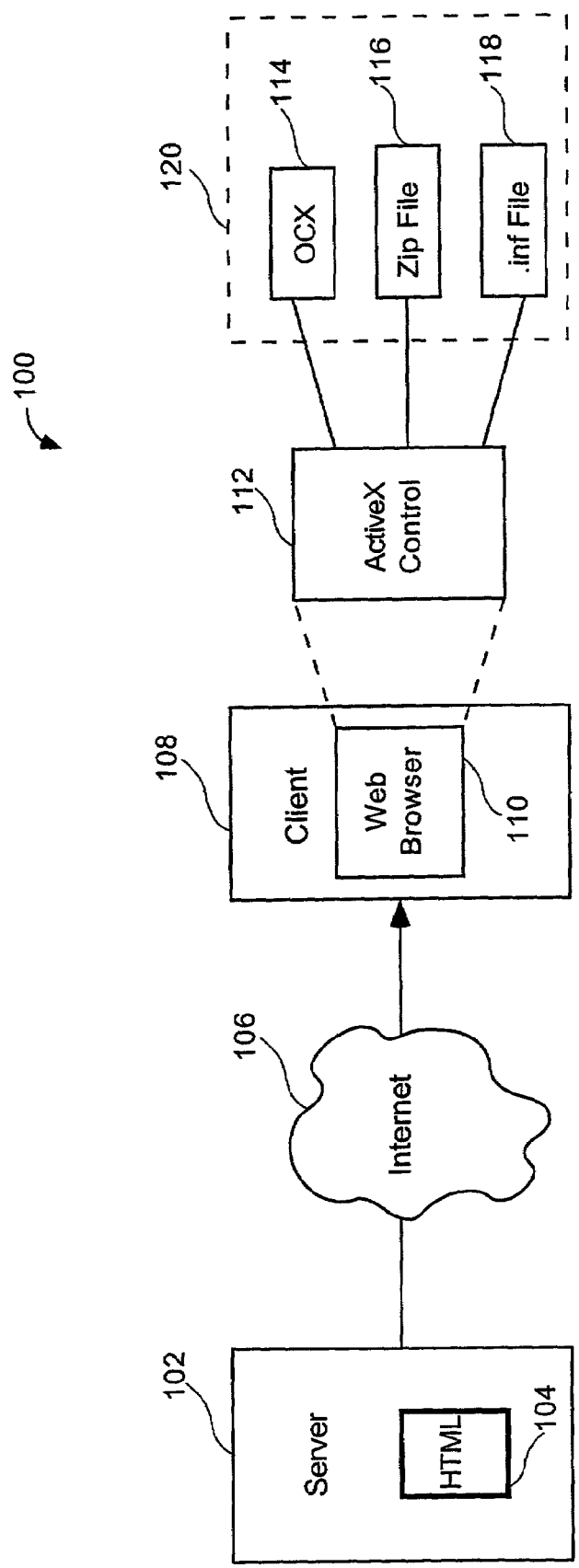
FIG. 1 illustrates a block diagram depicting the prior art manner of downloading an executable program from the Internet to run a Java application through a web browser.

An invention is described for a software tool capable of identifying classes utilized in separate groups or modules of an executable application in order to assist in the efficient downloading of an executable file from the Internet. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and an apparatus for providing timely downloading via the Internet of applications. In order to speed up the downloading of a program, the program is first subdivided into modules of software classes in one embodiment of the invention. The modules are selected such that each module contains all the classes necessary for implementing a specific program task. As used herein, the embodiments that enable efficient handling and downloading of an application and components is generic to any kind of application and application components. However, for ease of discussion, reference will be made to a printer and the application options available to the user of the printer. These applications and options may be, for example, available on the vendor's web site. For example, one module may include all the classes for generating a graphical user interface (GUI), another for selecting and downloading images, a third for printing, a fourth for rotating or cutting an image, etc. At least one module must include the core classes necessary to running the engine of the application in one embodiment. The core module may accept instructions from the command line, or preferably, the core module downloads and installs the GUI module to provide the user with a more convenient interface.

When an executable program is to be downloaded, only the core module, which is much smaller than the complete executable program, is downloaded. Thus, it naturally follows that the time to download the core module is much less than the time to download the complete file. In one embodiment, the core module then downloads and installs the GUI module, which presents the user with various program options. While running the program, as a user selects options not part of the core module, the core module checks to see if the module capable of implementing the selected option is locally available. If the required module is not available, the required module is downloaded from the web and automatically uploaded into the running program. This method is further described in U.S. patent application Ser. No. 09/999, 658.

In order to efficiently download the executable program, the program needs to be properly divided into autonomous class modules. As programs grow in complexity, it has become practically impossible to identify all the classes used by specific tasks, or groups of tasks. The present invention aides in subdividing a large collection of classes into autonomous modules by providing a monitoring tool to record the classes utilized by modules of the program.

In one embodiment, after a software package is finished and operational, a monitoring program watches the execution of the software package and maintains a record of all the classes that are used during the execution of selected tasks. As mentioned earlier, the application and its options can be for any type of application that enable execution by one or more processing entities. In the example of a printer coupled to a personal computer, the selected tasks may include tasks related to printing or editing graphics or text files in one embodiment. More specifically, tasks such as: rotate, print, color, insert text, etc. are included. The monitoring program then defines modules for each task including all the classes used in the implementation of the task.

In another embodiment of the invention, duplicate classes from multiple modules may be moved to a common module or placed only in the most frequently used module. Incomplete modules that require the use of additional classes may be given links to target modules that hold needed classes in one embodiment. Thus, if an incomplete module is installed, it forces the installation of all its linked target modules. Alternatively, classes common to multiple modules may be incorporated into the core modules so that they are always available as the core module is downloaded initially to run the engine of the application.

Figure 2:
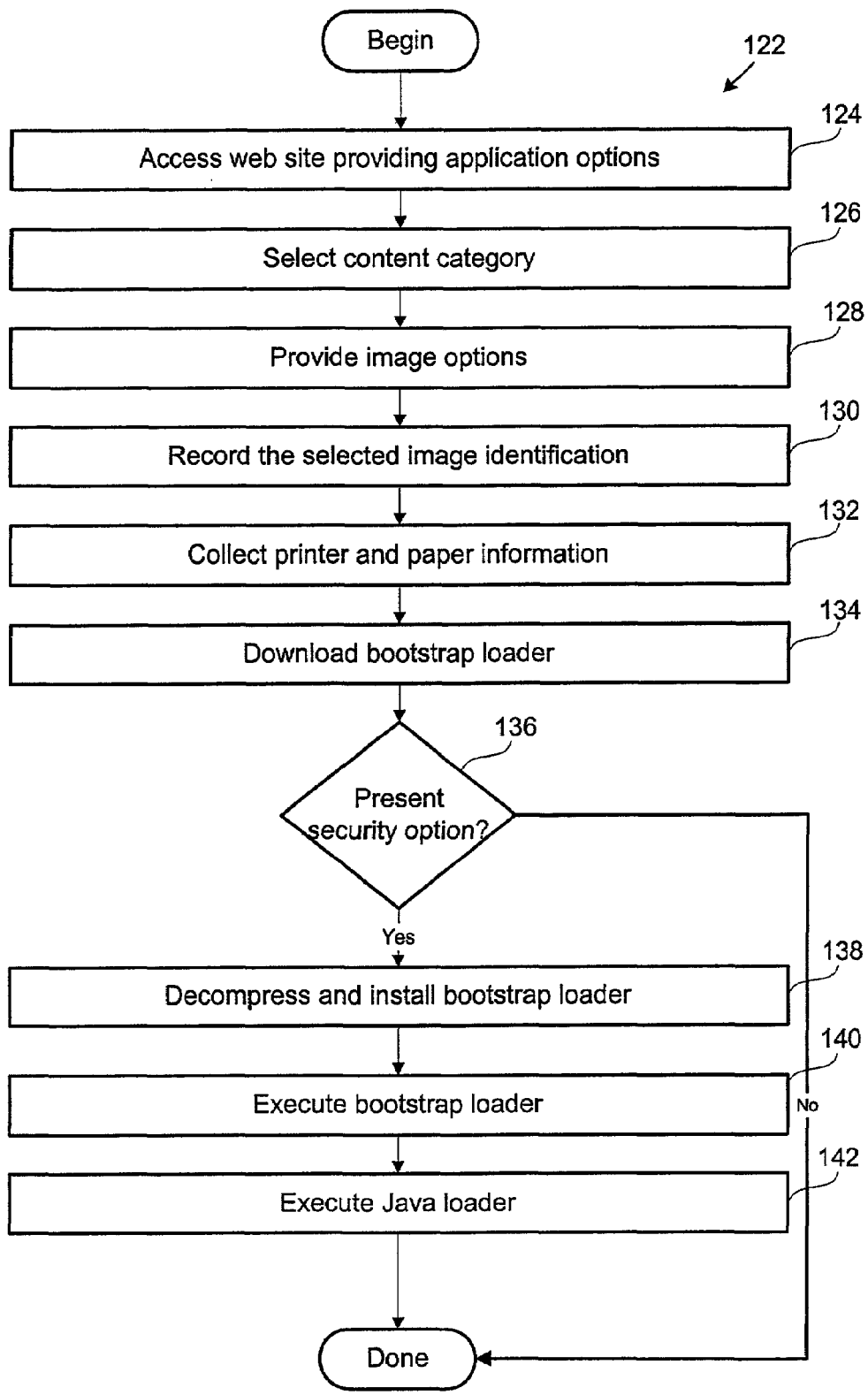
FIG. 2 illustrates a flowchart depicting an overview of a method for downloading an application from the Internet in accordance with one embodiment of the invention.

FIG. 2 illustrates flowchart 122 depicting an overview of a method for downloading an application from the Internet in accordance with one embodiment of the invention. Flowchart 122 initiates with operation 124 where a web site providing application options is accessed. As mentioned earlier, the application and its options can be for any type of application that enables execution by one or more processing entities. In the example of a printer coupled to a personal computer, an application may include functionality for creating greeting cards, invitations, book cover, art template, business cards, gift wrappers, gift boxes, etc. The method advances to operation 126 where a content category is selected from the list of options. Here, the user selects one of the above mentioned applications from operation 124 and a list of content categories is presented to the user. For example, the user may choose to create a greeting card and then be presented with a list of content categories to be used for the greeting card. Of course, any number of images fit for a greeting card can be presented here such as a floral arrangement, a print, a photo of a movie star, etc. Then in operation 128, image options for the selected content category are provided. In one embodiment, the image is stored in a database. The method then proceeds to operation 130 where the selected image identification is recorded. Here, the image is stored for later use by the Java application.

Continuing with FIG. 2, printer and paper information is collected in operation 132. The printer model, paper size, margin information, etc. are collected in one embodiment. Next, in operation 134 a bootstrap loader is downloaded. Here, the web browser downloads and installs a .cab file which can be used for loading a Java application and different modules associated with the Java application. The method proceeds to operation 136 where the user is presented with a security option. In one embodiment if the user refuses the security option then the method will terminate. Assuming the user accepts the security option then the method advances to operation 138 where the web browser decompresses and installs the bootstrap loader i.e., .cab file. Next, in operation 140 the bootstrap loader is executed. In one embodiment, the bootstrap loader is in the form of an ActiveX control. The method then proceeds to operation 142 where the bootstrap loader will start a Java loader. In one embodiment the Java loader is included in the .cab file. As will be explained below in more detail, the Java loader enables the downloading of the desired application in an efficient and expeditious manner, no matter if the user has a relatively slow Internet connection. That is, the application will be immediately available for use, no matter if all of the components needed for a task have not been downloaded.

Figure 3:
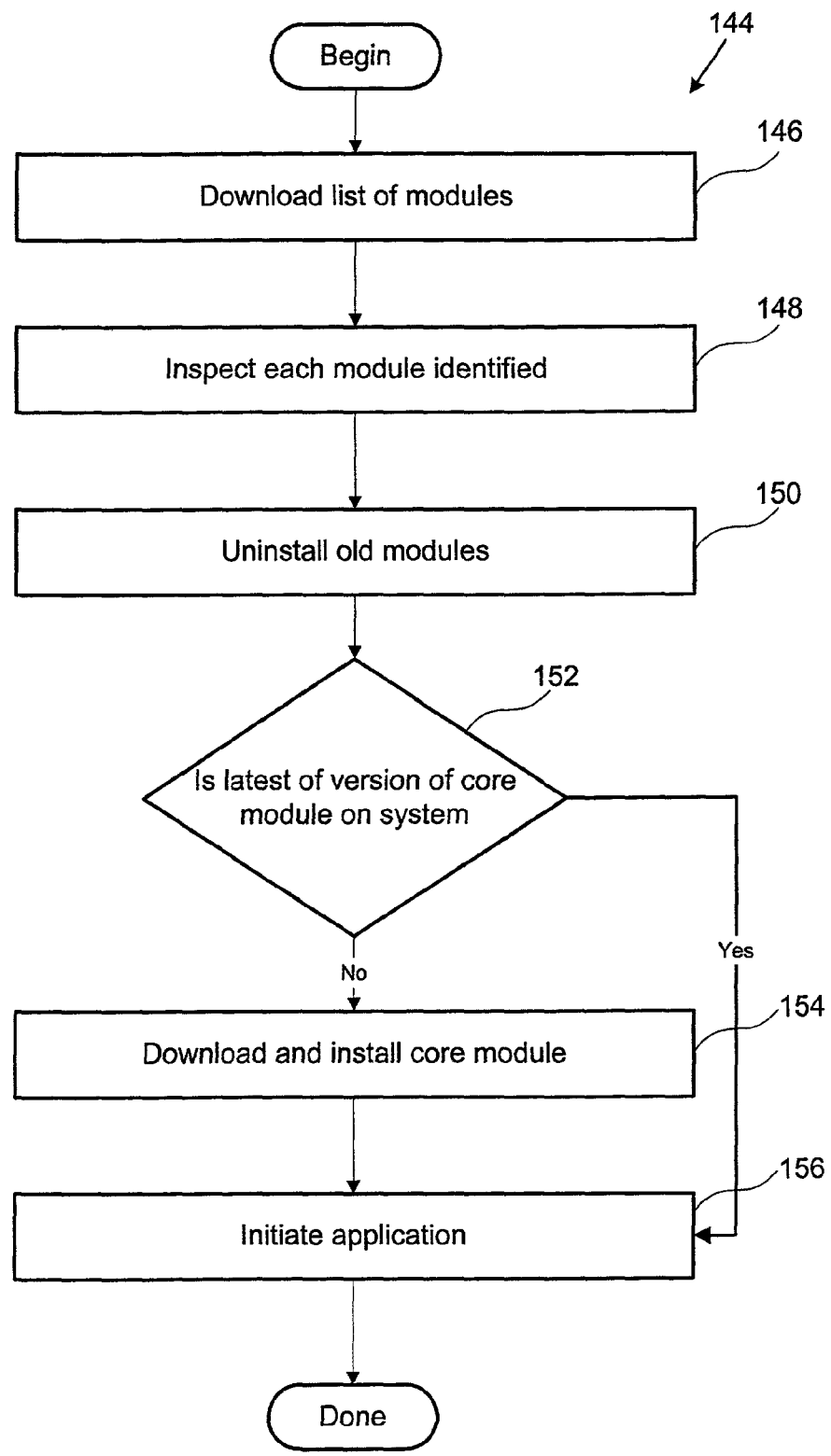
FIG. 3 illustrates a flowchart depicting a high level method where the Java loader downloads and installs the application in accordance with one embodiment of the invention.

FIG. 3 illustrates flowchart 144 depicting a high level method where the Java loader downloads and installs the application and its components in accordance with one embodiment of the invention. The method initiates with operation 146 where a list of modules used by the application of operation 124 is downloaded. In one embodiment, the list of modules includes the name of the modules and version information of the modules. An example of the list of the modules is presented in FIG. 4 and will be explained in more detail below.

Figure 4:
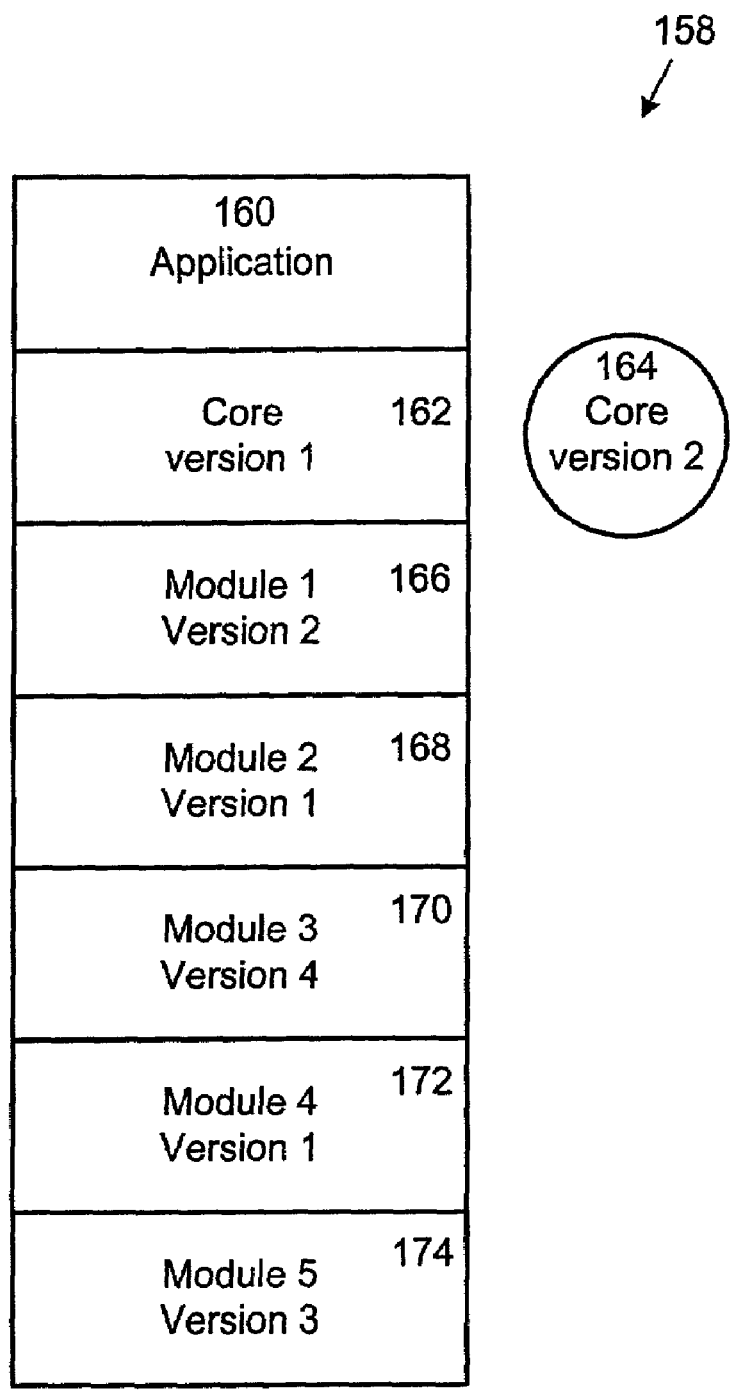
FIG. 4 displays a block diagram illustrating a list of modules downloaded in operation 146 of FIG. 3 in accordance with one embodiment of the invention.

Moving to FIG. 4, block diagram 158 illustrates the list of modules downloaded in operation 146 of FIG. 3 in accordance with one embodiment of the invention. It should be understood that the list of modules illustrated in block diagram 158 are simply illustrative of a number of modules, and thus, any number of modules may exist depending on the software application and use thereof. With the foregoing in mind, application 160, core modules and multiple non-core modules are shown. Here, it is shown that core module version 1 162 has been superseded by core module version 2 164. Accordingly, the list of modules downloaded in operation 146 of FIG. 3 includes only the most recent version of the core module, i.e. version 2 164 in one embodiment. It should be appreciated that core module version 1 is being displayed for illustrative purposes only. The list of FIG. 4 further includes modules 1–5, represented as blocks 166–174. In one embodiment of the invention, the list of modules used by the application is compared to the modules on the local system to determine which modules the system requires to be downloaded.

Returning back to FIG. 3, the method advances to operation 148 where the Java loader will inspect each module on the list to verify if the module is present on the local system. For example, each of the modules of FIG. 4, i.e. modules 164–174, are checked to determine if they are already present on the local system. Next, in operation 150 any old versions of the modules identified by operation 148 are uninstalled. For example, if the local system had core version 1 162 loaded from a prior use of the application, then it would be uninstalled here. Additionally, if any older versions of the non-core modules are on the local system, then they are uninstalled also. In one embodiment, if the older version of the non-core module is a shared module, then the non-core module is not uninstalled. Then, the method proceeds to decision operation 152 where it is determined if the latest version of the core module is on the system. If the latest version of the core module in not on the system, then the latest version of the core module is downloaded and installed in operation 154. In one embodiment of the invention, the core module contains the class that has the entry point. In another embodiment of the invention, the class that has the entry point is requested by the Java loader to initiate the downloading of the core module. If the latest version of the core module is on the local system, then the method advances to operation 156 where the application is initiated.

Figure 5:
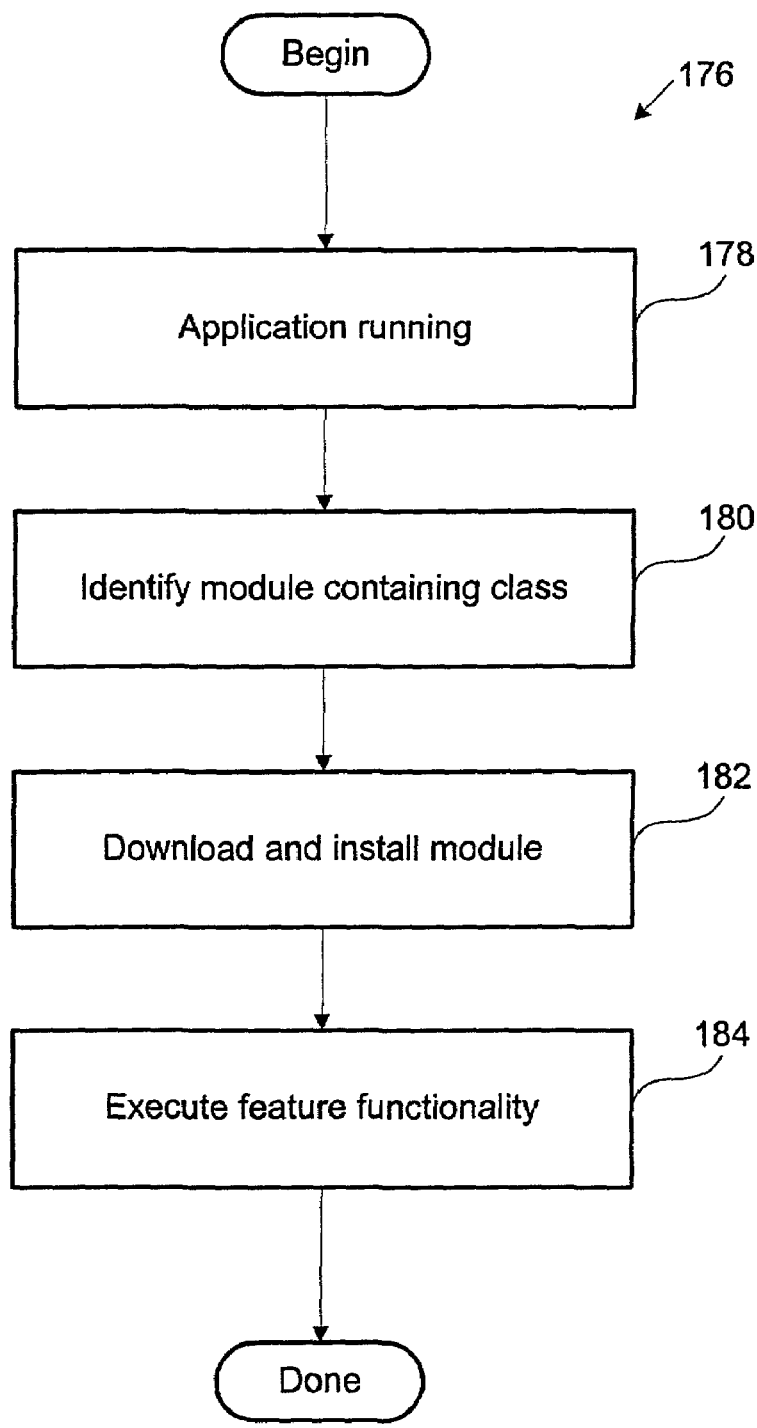
FIG. 5 illustrates a flowchart displaying a method of where modules are downloaded and installed when needed as the application is running in accordance with one embodiment of the invention.

FIG. 5 illustrates flowchart 176 displaying a method where modules are downloaded and installed when needed as the application is running in accordance with one embodiment of the invention. Flowchart 176 initiates with operation 178 where the application is running on the local system. It should be appreciated that as the user is running the application and utilizing different functionality, eventually a module besides the core module will be required. Following the example of a printer, a class not included in the core module may be required for some operation such as printing, editing, formatting, etc. The method then advances to operation 180 where the module containing the required class is identified. The method moves to operation 182 where the module containing the required class is downloaded and installed on the local system. For example, referring back to FIG. 4, if module 4 172 is needed for a particular feature of the application, then module 4 172 will be downloaded and installed. The method advances to operation 184 where the feature functionality provided by the class of the downloaded module is executed. After operation 184 the method returns to operation 178 where the application continues running. Of course, components of the application are generally, in one embodiment, running in the background. A user can also quit or exit out of the application when they desire.

Figure 6:
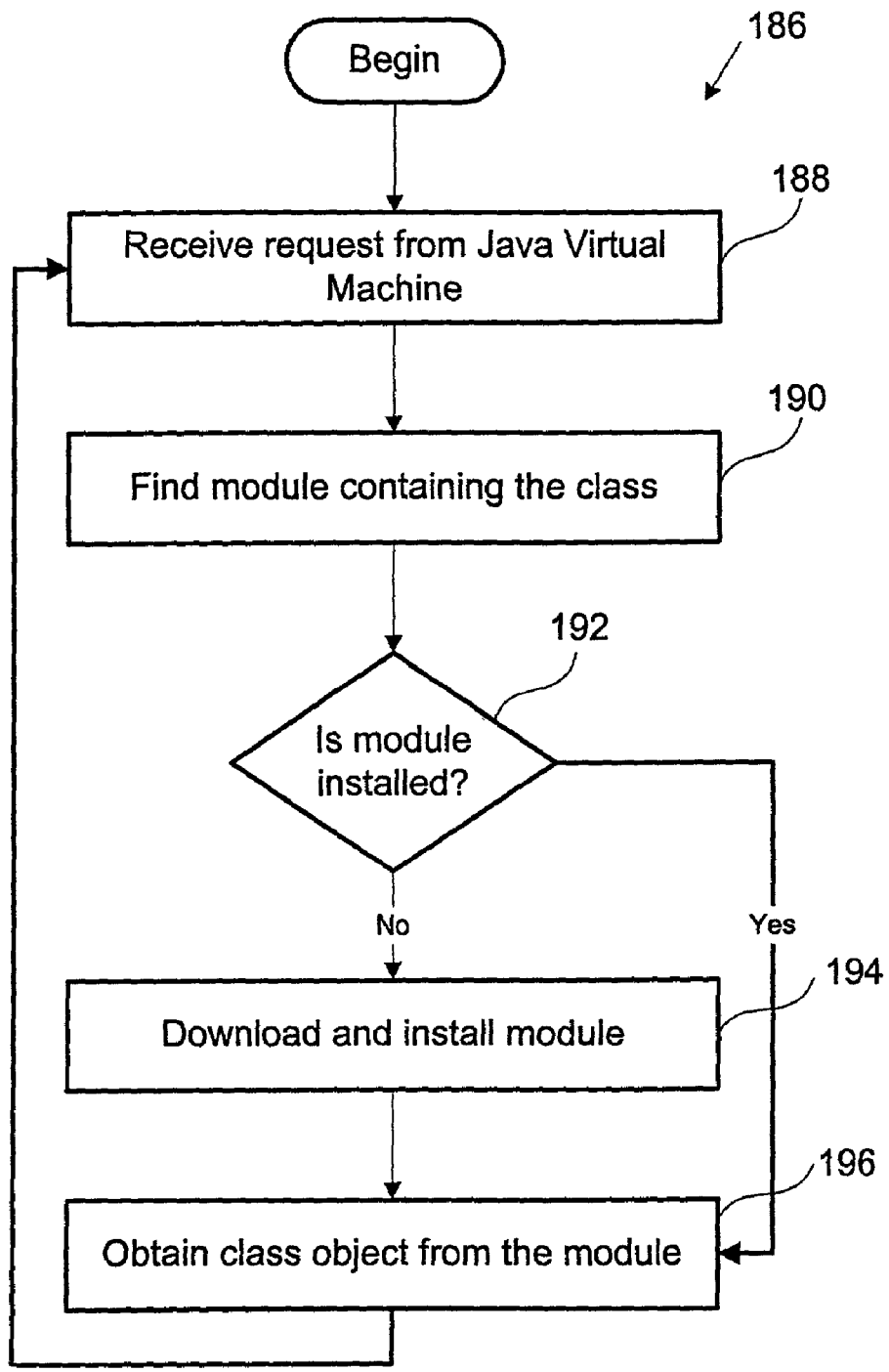
FIG. 6 illustrates a flowchart displaying a more detailed description of downloading the modules for the application in accordance with one embodiment of the invention.

FIG. 6 illustrates flowchart 186 displaying a more detailed description of downloading the modules for the application in accordance with one embodiment of the invention. Flowchart 186 initiates with operation 188 where a request is received from the Java Virtual Machine (JVM). For example, when initially starting the application a class loader will receive a request from the Java Virtual Machine to run the main class in one embodiment. The main class is contained within the core module in another embodiment of the invention. It should be appreciated that the Java Virtual Machine is only concerned with classes and not modules, while the class loader maps classes into modules.

The method then advances to operation 190 where the module containing the class is found. Operation 190 will be explained in more detail in reference to FIG. 7. Next, in decision operation 192 it is determined if the module found in operation 190 is installed on the local system. If the module is not on the local system, then the module is downloaded and installed in operation 194. If the module is installed on the local system, then the method advances from operation 192 to operation 196 where the class object desired is obtained from the module.

Once the method of FIG. 6 obtains the class object from the module, the method returns to operation 188. In one embodiment the class object is returned to the Java Virtual Machine here. It should be appreciated that upon the initial loading of the application to the local system, the class containing the entry point asks for the next class and so on until all interrelated classes are loaded. In one embodiment, the main class containing the entry point is mapped into the core module. As an illustrative example, class A contains the entry point and upon initiation is requested first by the Java Virtual Machine. Class A will request class B and so on, until all interrelated classes consisting of the core module are loaded.

The above illustrative example is also applicable to other non-core modules which allow for feature functionality. Once the classes comprising the core module are installed a user may elect to perform tasks which require feature functionality. In the example of a printer and its applications, the user may wish to rotate or print a graphic. Once the rotate or print button is activated, then code will ask the Java Virtual Machine for a class enabling the feature functionality. Accordingly, the Java Virtual Machine will request the class required for the feature functionality and operations 188–196 will be repeated for the required class and all interrelated classes. As will be explained in further detail in reference to FIGS. 8–10, the modules enabling feature functionality may also be downloaded in the background prior to being requested by the user in another embodiment.

Flowchart 190 initiates with operation 198 where the Java Virtual Machine requests the class loader to load a class. The method advances to operation 200 where the installed module is searched for the requested class. One skilled in the art would appreciate that various techniques are available to search the data structure for the requested class. The method then proceeds to decision operation 202 to determine if the requested class has been found. If the class is found on the installed modules of the local system then the class is returned to the Java Virtual Machine in operation 204.

Figure 7:
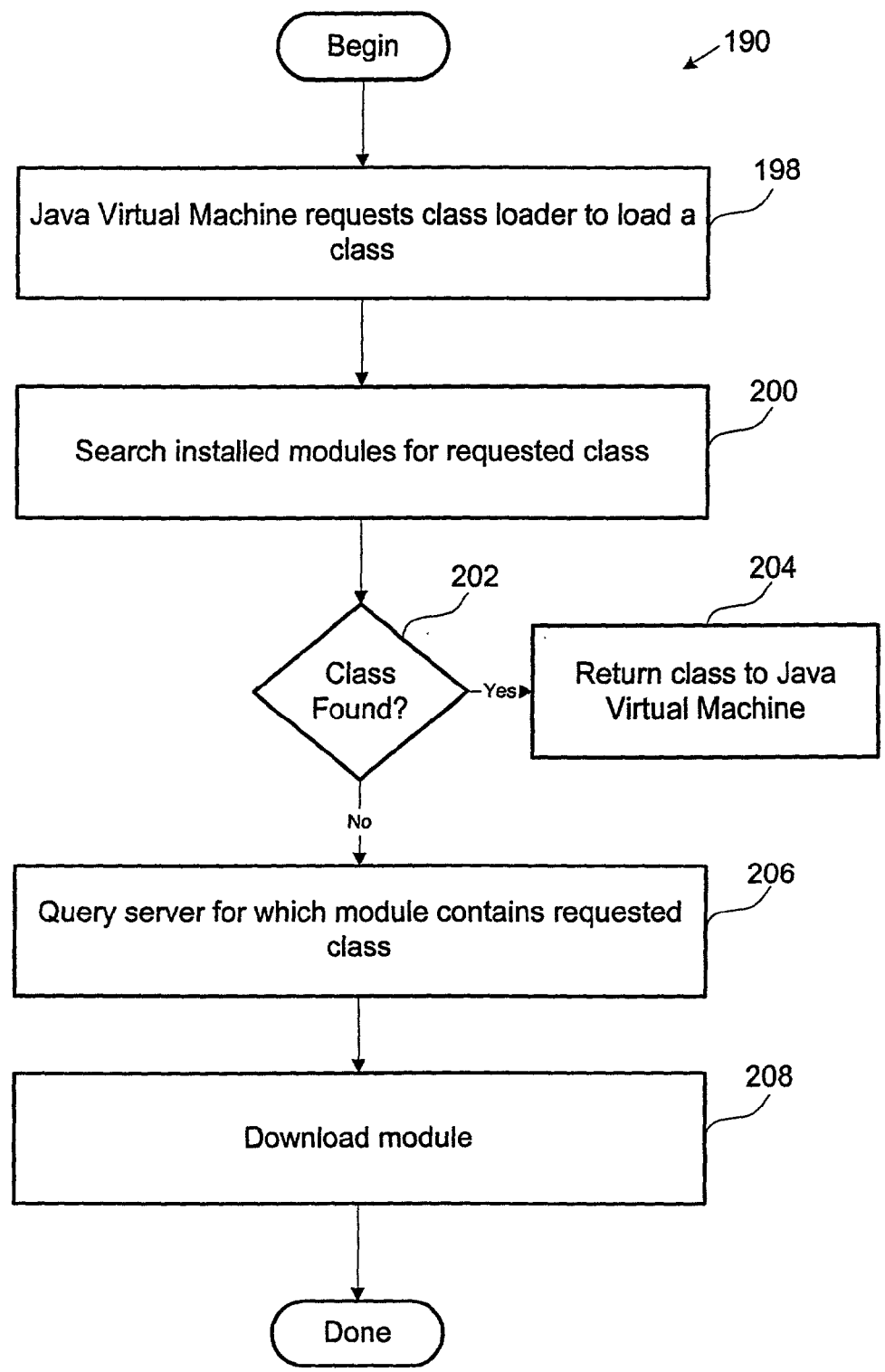
FIG. 7 illustrates a flowchart depicting a more detailed description of operation 190 of FIG. 6 where a module containing a requested class is located through a class loader thread in accordance with one embodiment of the invention.

If the class is not found, then the method of FIG. 7 proceeds to operation 206 where the server is queried for which module contains the requested class. In one embodiment, each class is associated with a module on the server, i.e. the server has a data structure that matches the classes to the modules. Accordingly, the module containing the requested class is identified here in one embodiment of the invention. The method proceeds to operation 208 where the module containing the requested class is downloaded. In one embodiment, the module is downloaded interrelated class by interrelated class as discussed with reference to FIG. 6. In yet another embodiment, the downloaded module is also installed. Table 1, below, includes illustrative code for installing the module in accordance with one embodiment of the invention. Of course, the code can take on any form, so long as the installing function is completed.

TABLE 1

```
* Copyright (c) 1995–2001 EPSON Palo Alto Laboratory. All Rights
Reserved.
"
// Load the package contained in zf.
public static void installPackage (File zFile) throws IOException {
    ZipFile zf = new ZipFile (zFile) ;
    try {
        ArchiveInfo ai = new ArchiveInfo (zf) ;
        // save resource files
        for (Enumeration e = zf.entries( ) ; e.hasMoreElements( ) ; ) {
            ZipEntry ze = (ZipEntry) e.nextElement( ) ;
            String zipName = ze.getName( );
            if ( !zipName.endsWith (".class")) {
                ze = zf.getEntry (zipName) ;
                zipName = zipName.replace('\\','/');
                InputStream is = zf.getInputStream(ze);
                if (ai.isSharedModule( )) {
                    saveResource (SmartLauncher.getSharedResourceDir( ) , zipName, is) ;
                } else {
                    saveResource (SmartLauncher. getAppResourceDir( ) , zipName, is) ; }
            }
        }
    }
    // Find system class files and install them to the shared class directory.
    for (Enumeration e = ai.getSystemClasses( ).elements ( ); e.hasMoreElements( ); ) {
        String sysClass = (String) e.nextElement( );
        ZipEntry ze = getZipEntryFromClassName (zf, sysClass) ;
        if (ze = = null) {
            throw new IOException ("Can not find system class" + sysClass) ;
        }
        InputStream is = zf.getInputStream (ze) ;
        saveClass (SmartLauncher.getSharedSystemClassDir( ) , sysClass, is) ;
    }
    // Find system class files and install them to the shared class directory.
    for (Enumeration e = ai.getSystemResources( ) .elements( ) ; e.hasMoreElements( ) ; ) {
            String sysResource = (String) e.nextElement( );
            ZipEntry ze = zf.getEntry (sysResource);
            if (ze = = null) {
                throw new IOException ("Can not find system class " + sysResource) ;
            }
            InputStream is = zf.getInputStream (ze) ;
            SaveResource (SmartLauncher.getSharedSystemClassDir( ) , sysResource, is);
    }
    // Call install function
    if (ai.getMetaClass( ) ! = null) {
            try {
                InstallClassLoader installLoader = new InstallClassLoader (zf);
                Class clsMeta = installLoader.loadClass (ai.getMetaClass( ), true) ;
                Object mc = clsMeta.newInstance( ) ;
                Class[ ] clsParams = { java.util.Hashtable.class } ;
                Method m = clsMeta.getMethod("install" , clsParams) ;
                Object[ ] objParams = { createInstallProperties (getSmartClassLoader( ) , zf) } ;
                // Call install function.
                m.invoke (mc, objParams) ;
            } catch (Exception e) {
                // Can not call meta class install.
                System.out.println ("Install function ignored in class " + ai.getMetaClass( )) ;
            }
    }
    } finally {
        zf.close( ) ;
    }
}
```

Figure 8:
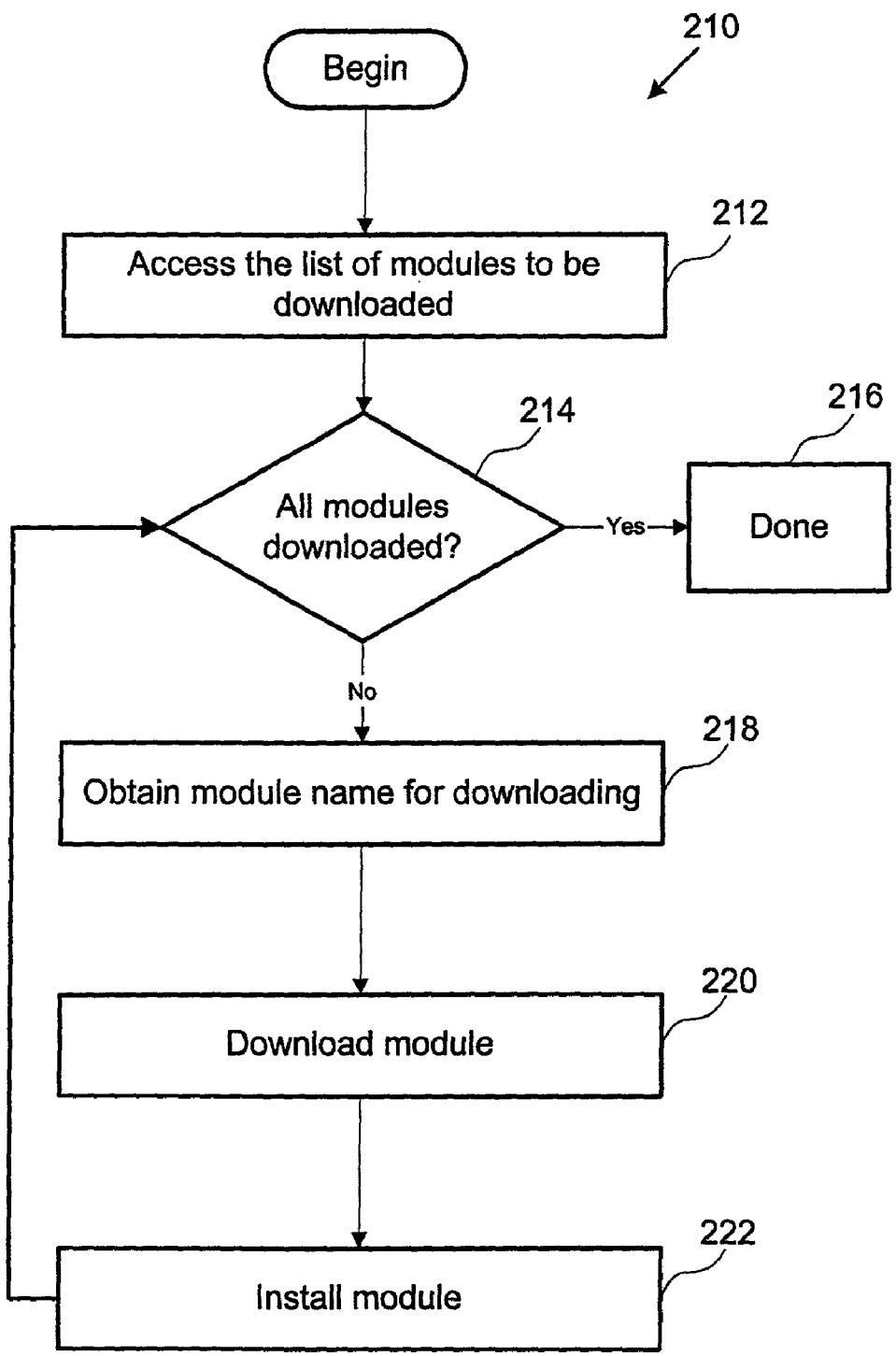
FIG. 8 illustrates a flowchart representing a method for performing background downloading in a multithread environment once the main application has started in accordance with one embodiment of the invention.

FIG. 8 illustrates flowchart 210 representing a method for performing background downloading in a multithread environment once the main application has started in accordance with one embodiment of the invention. It should be appreciated that the method of flowchart 210 can operate in a multithread environment with the method described in reference to FIG. 7. Flowchart 210 initiates with operation 212 where the list of modules to be downloaded is accessed. In one embodiment, the list of modules includes a priority list representing the order in which the modules are downloaded in the background environment. An exemplary priority list is described below in reference to FIG. 9.

Figure 9:
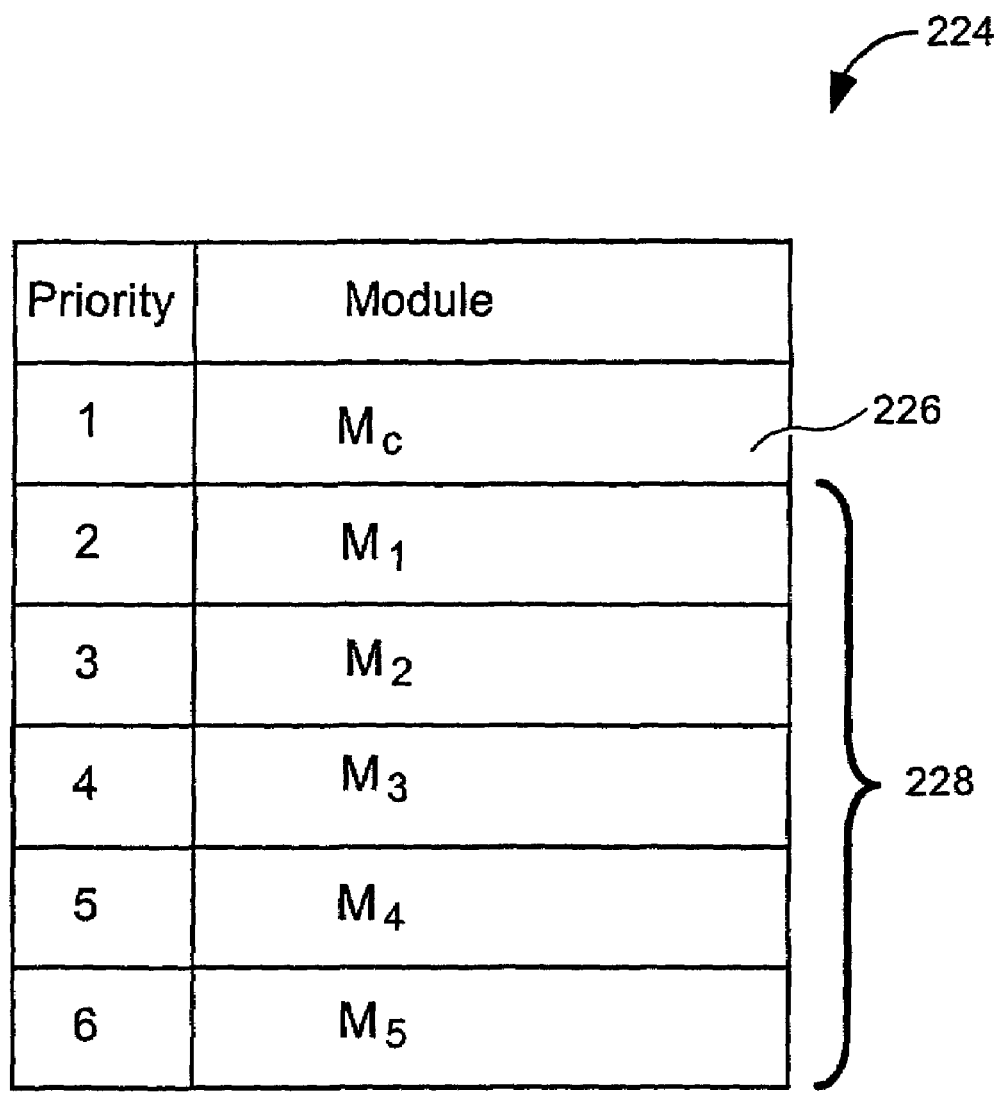
FIG. 9 illustrates a block diagram representing a priority list of the various modules to be downloaded for an application in accordance with one embodiment of the invention.

FIG. 9 illustrates block diagram 224 representing a priority list of the various modules to be downloaded for an application in accordance with one embodiment of the invention. As displayed in block diagram 224, each module including the application is assigned a priority. For example, the core module ($M_c$) 226 is assigned a priority of 1, the highest priority. The core module must be downloaded first, therefore, $M_c$ must receive the highest priority. The remaining modules, $M_1$–$M_5$, 228 are associated with priorities 2–6, respectively. In one embodiment, the priority list is contained on a networked source server (e.g., which contains the application and its modules). As will be explained further below, the local system may have some of the modules installed from running the application previously. In this situation, the download manager is initialized with a list of needed modules to be downloaded, thereby ensuring that the download manager will not download modules which are already installed. The list of modules may also be the list of modules of FIG. 4 with a priority included in one embodiment of the invention.

Returning back to FIG. 8, once the priority list is accessed in operation 212 the method advances to decision operation 214 where it is checked if all the modules are downloaded on the local system. Here, the list of modules as discussed in reference to FIGS. 3, 4 and 9 is checked to determine which modules, if any, need to be downloaded. If all the modules from the list are installed on the local system, then the method ends in operation 216. If all the modules have not been downloaded, then the method proceeds to operation 218 where a module name for downloading is obtained. For example, if $M_c$ and $M_2$ are already installed locally on the system, then the module name for $M_1$ will be obtained in operation 218 since $M_1$ is the highest priority module remaining. The module corresponding to the module name obtained in operation 218 is downloaded in operation 220.

The downloaded module is then installed in operation 222. It should be appreciated that the example code for installing the module, as presented in Table 1, may be executed in operation 222 in accordance with one embodiment of the invention. The loop involving operations 214–222 will repeat itself until all modules have been downloaded.

Figure 10:
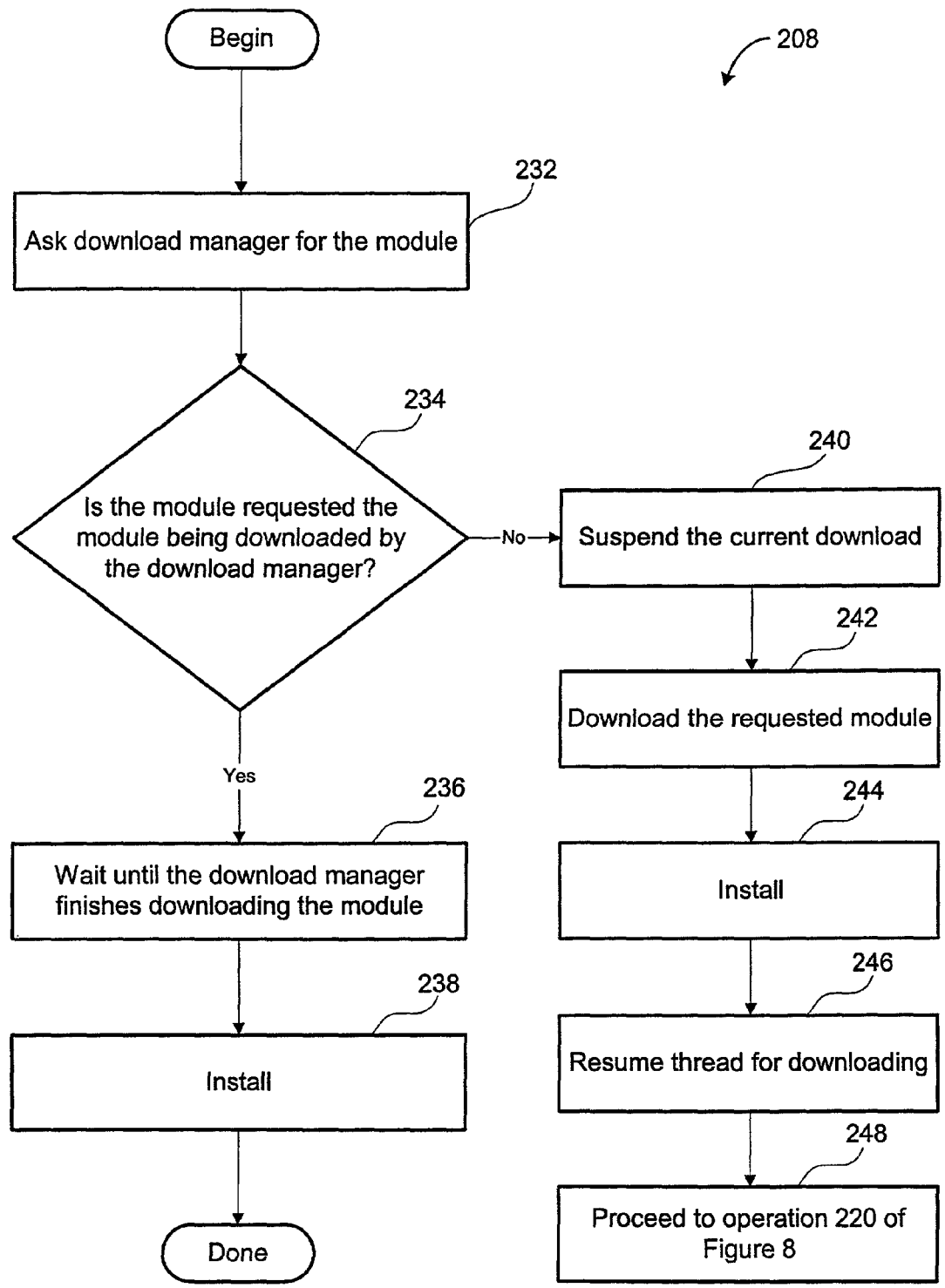
FIG. 10 illustrates a flowchart displaying a more detailed description of operation 208 of FIG. 7 where a module is downloaded in a multithread environment under the download manager logic in accordance with one embodiment of the invention.

FIG. 10 illustrates flowchart 230 displaying a more detailed description of operation 208 of FIG. 7, where a module is downloaded in a multithread environment under the download manager logic in accordance with one embodiment of the invention. Flowchart 208 initiates with operation 232 where the download manager is asked for the module to be downloaded. It should be appreciated that the class loader has control here. The method proceeds to decision operation 234 where it is determined if the module requested is the module being downloaded by the download manager. If the module requested is the module being downloaded by the download manager, then the method moves to operation 236 where the method waits until the download manager completes downloading the module. It should be appreciated that common pausing techniques known to one skilled in the art can be utilized in this operation.

Alternatively, if the module requested is not the module being downloaded by the download manager in decision operation 234 of FIG. 10, then the method proceeds to operation 240 where the current download is suspended. For example, a user wishes to rotate an image and needs module 4 ($M_4$) for the feature functionality. However, the module being downloaded by the download manager is module 3 ($M_3$). The download of $M_3$ is suspended in operation 240 so that $M_4$ may be downloaded without competing with $M_3$ for bandwidth. In one embodiment of the invention, the download manager logic comprising this decision operation is only initiated when the user interrupts the methodical download of the modules as governed by the priority list. The method advances to operation 242 where the requested module is downloaded. Continuing with the example above, $M_4$ would be downloaded here as $M_3$ is suspended. In one embodiment, another instantiation of the code which was downloading $M_3$ is used to download $M_4$. In operation 244, the requested module is installed. The method moves to operation 246 where the thread for the suspended download is resumed. In reference to the above example, the downloading of $M_3$ is resumed upon the installation of $M_4$. Then in operation 248, the method proceeds to operation 220 of FIG. 8 where the module is downloaded.

Table 2, below, includes illustrative code for class loader in accordance with one embodiment of the invention. Of course, the code can take on any form, so long as the class loading function is completed.

TABLE 2

```
/*
"
* $Workfile: SmartClassLoader.java $
"
*
"
* Copyright © 1995–2001 EPSON Palo Alto Laboratory. All Rights Reserved.
"
* EPSON Research and Development, Inc. A Seiko EPSON Subsidiary. * All rights reserved.
*
*/
package epal.compman;
import java.util.*;
import java.util.zip.*;
```

TABLE 2-continued

```
import java.io.*;
import java.net.*;
import java.lang.*;
import java.lang.reflect.*;
/**
 * Class description goes here.
 *
 *
 */
public class SmartClassLoader extends java.lang.ClassLoader {
    // maps from the class name to the loaded Class object.
    private Hashtable m_classCache = new Hashtable();
    // maps from the package name to the archive file.
    private Hashtable m_packageMap = new Hashtable();
    // maps from the class name to the archive file.
    private Hashtable m_classMap = new Hashtable();
    // maps from the resource name to the archive file.
    private Hashtable m_resourceMap = new Hashtable();
    public SmartClassLoader() throws IOException {
        super();
    }
    public URL getResource(String name) {
        URL url = getSystemResource(name);
        if (url != null)
            return url;
        String szResourceFile = name.replace('/', File.separatorChar);
        File f = new File(SmartLauncher.getAppResourceDir(), szResourceFile);
        try {
            return new URL("file", "localhost", f.getAbsolutePath());
        } catch (Exception e) {
            return null;
        }
    }
    public InputStream getResourceAsStream(String name) {
        InputStream is = getSystemResourceAsStream(name);
        if (is != null)
            return is;
        String szResourceFile = name.replace('/', File.separatorChar);
        File f = new File(SmartLauncher.getAppResourceDir(), szResourceFile);
        try {
            return new FileInputStream(f);
        } catch (Exception e) {
            return null;
        }
    }
     protected Class loadClass(String name, boolean resolve) throws
ClassNotFoundException {
//      System.out.println(name);
        if (name.indexOf("PIMJpegNative") != -1) {
            int i = 10;
        }
        if (name.indexOf("JopsDecoder") != -1) {
            int i = 10;
        }
        // Check if the class has been loaded before.
        Class c = (Class) m_classCache.get(name);
        if (c != null) {
            if (resolve) {
                resolveClass(c);
            }
            return c;
        }
        ArchiveInfo ai = (ArchiveInfo) m_classMap.get(name);
        if (ai != null) {
            // Check the version of the ArchiveInfo here.
            // Hack: Assume always ok.
```

TABLE 2-continued

```
            // the class can be loaded from the zip files.
            // Now check if the class should be loaded from the system.
            if (ai.getSystemClasses().indexOf(name) != −1) {
                // This is a class that should be loaded by the system class loader
                c = findSystemClass(name);
            } else {
                // Load from the zip file.
                ZipEntry ze = SmartLauncher.getZipEntryFromClassName(ai.getZipFile(),
name);
                try {
                    c = loadClassFromZipEntry(ai.getZipFile(), ze, name);
                } catch (IOException e) {
                    throw new ClassNotFoundException("Can not find class " + name);
                }
            }
        } else {
            // The class can not be loaded from the zip files.
                try {
                    // Try to load from the system.
            c = findSystemClass(name);
                } catch(Exception e) {
                    // The class can not be loaded from the zip files nor from the system.
                    // This class may be:
                    //   1. a resource bundle classed requested that is not found.
                    //   2. a class that should be downloaded or installed.
                    if (isResourceBundleClass(name)) {
                // The VM is requesting a package bundle class.
                throw new ClassNotFoundException();
                    }
            // The class can not be found by the system. Try to download the class and
install it.
                try {
                    File f = SmartLauncher.getDownloadManager().getZipFile(name);
                    SmartLauncher.getSmartClassLoader().loadPackage(f);
                } catch (Exception ioe) {
                    throw new ClassNotFoundException(ioe.getMessage());
                }
                ai = (ArchiveInfo) m_classMap.get(name);
                if (ai == null) {
                    // We should find the class here.
                    throw new ClassNotFoundException();
                } else {
                    try {
                        if (ai.getSystemClasses().indexOf(name) != −1) {
                            // This is a class that should be loaded by the system class loader
                            c = findSystemClass(name);
                        } else {
                            // Load from the zip file.
                            ZipEntry ze =
SmartLauncher.getZipEntryFromClassName(ai.getZipFile(), name);
                            c = loadClassFromZipEntry(ai.getZipFile(), ze, name);
                        }
                    } catch (Exception ex) {
                        throw new ClassNotFoundException(ex.getMessage());
                    }
                }
            }
        }
        if (resolve) {
            resolveClass(c);
        }
        m_classCache.put(name, c);
        return c;
}
public void loadPackages() throws IOException {
        File dir = SmartLauncher.getAppDir();
        String[] zfname = dir.list();
        if (zfname != null) {
            for (int i = 0; i < zfname.length; i++) {
                if (zfname[i].endsWith(".zip")) {
                    try {
                        loadPackage(new File(dir, zfname[i]));
                    } catch (ZipException ze) {
                        File f = new File(dir, zfname[i]);
                        f.delete();
                    }
                }
            }
        }
```

TABLE 2-continued

```
            dir = SmartLauncher.getsharedDir();
            zfname = dir.list();
            if (zfname != null) {
                for (int i = 0; i < zfname.length; i++) {
                    if (zfname[i].endsWith(".zip")) {
                        try {
                            loadPackage(new File(dir, zfname[i]));
                        } catch (ZipException ze) {
                            File f = new File(dir, zfname[i]);
                            f.delete();
                        }
                    }
                }
            }
        }
        public void loadPackage(File fZipFile) throws IOException {
            ZipFile zf = new ZipFile(fZipFile);
            ArchiveInfo ai = new ArchiveInfo(zf);
            // Load the classes.
            for (Enumeration e = zf.entries(); e.hasMoreElements();) {
                ZipEntry ze = (ZipEntry) e.nextElement();
                String zipName = ze.getName();
                if (zipName.endsWith(".class")) {
                    String className = getClassNameFromZipName(zipName);
                    m_classMap.put(className, ai);
                    m_packageMap.put(getPackageName(className), ai);
                } else {
                    zipName = zipName.replace('\\','/');
                    m_resourceMap.put(zipName, ai);
                }
            }
        }
        // Load a class contained in ze.
        private Class loadClassFromZipEntry(ZipFile zf, ZipEntry ze, String className)
throws IOException {
            String szZipName = ze.getName();
            InputStream is = zf.getInputStream(ze);
            ByteArrayOutputStream baos = new ByteArrayOutputStream();
                    byte[] tempBuf = new byte[1024];
                int bytesRead = 0;
            try {
                do {
                        bytesRead = is.read(tempBuf,0,1024);
                            if (bytesRead > 0) {
                            baos.write(tempBuf,0,bytesRead);
                        }
                } while (bytesRead >= 0);
            } catch (EOFException eofex) {
                // This is fine.
            }
        is.close();
        byte[] clsData = baos.toByteArray();
        return defineClass(className, clsData, 0, clsData.length);
}
private String getClassNameFromZipName(String zipName) {
        int index = zipName.lastIndexOf(".class");
        if (index <= 0)
            return null;
        String className = zipName.replace('/','.');
        className = className.replace('\\','.');
        return className.substring(0, index);
}
/**
    Returns the package name of a class.
 */
private String getPackageName(String className) {
        int index = className.lastIndexOf(".");
        if (index <= 0)
            return "";
        return className.substring(0, index);
}
```

TABLE 2-continued

```
private String getBaseclassName(String name) {
    int iBegin = Math.max(0, name.lastIndexOf("."));
    int iEnd = name.indexOf("_", iBegin);
        if (iEnd == -1) {
            return name;
        }
        return name.substring(O, iEnd);
}
private boolean isResourceBundleClass(String name) {
    String base = getBaseclassName(name);
    base = base.replace('.', File.separatorChar);
    File f = new File(SmartLauncher.getAppResourceDir(), base + ".properties");
    if (f.exists())
        return true;
    return false;
    }
}
```

Figure 11:
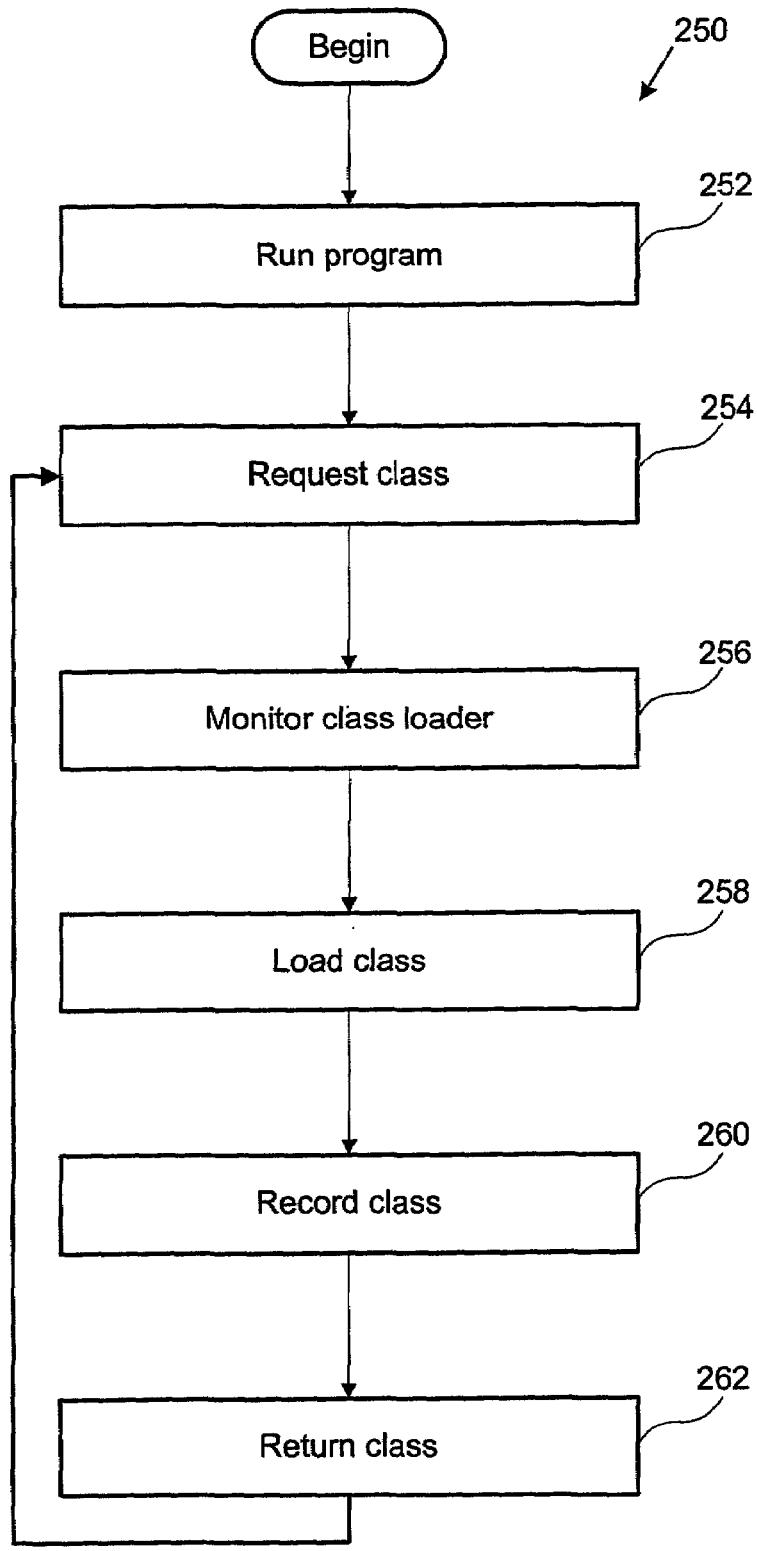
FIG. 11 illustrates a flowchart displaying a method for monitoring the installation of classes for an executable program to create modules for various feature functionality of the program in accordance with one embodiment of the invention.

FIG. 11 illustrates flowchart 250 displaying a method for monitoring the installation of classes for an executable program to create modules for various feature functionality of the program in accordance with one embodiment of the invention. Flowchart 250 initiates with operation 252 where a command to run the executable program is received. Next, in operation 254 a request for a class is generated. In one embodiment, the Java Virtual Machine requests the class. It should be appreciated that upon initiation of the executable program, a group of classes, i.e. a core module, allows the program to be executed so that the features of the core module are instantly available to a user. As mentioned above, upon the initiation of the program the core module contains the main class which has the entry point. The method advances to operation 256 where the class loader is monitored. In one embodiment, the class loader is monitored by overriding the Java default class loader by writing another class loader which extends off the Java class loader. Next, in operation 258 the requested class is loaded. In one embodiment, the requested class is loaded from a file system. The method then advances to operation 260 where the loaded class is recorded. It should be appreciated that the class is recorded in a set or vector such that all interrelated classes included in a module are recorded. Thus, operation 260 begins the definition of the classes making up the core module or the classes making up a module associated with a non-core module. As referred to herein, a non-core module is a module which includes classes associated with a feature functionality or task of the program, whereas the core module includes the classes necessary for running the application.

The method of FIG. 11 then proceeds to operation 262 where the class is returned to the Java Virtual Machine. In one embodiment, if the class being returned to the Java Virtual Machine is interrelated to another class then the Java Virtual Machine will request the interrelated class and operations 254–262 will be repeated. For example, if class A, which was just downloaded, is interrelated to class B, then the Java Virtual Machine will request class B. Class B is recorded in operation 260 and the module of interrelated classes is being built as the application is being executed. It should be appreciated that a class can be interrelated to more than one other class. Following along these lines, if class B is interrelated to class C and class J then the Java Virtual Machine requests both class C and class J in another embodiment. Therefore, the class graph for each module is created on the fly as the application is being executed. The logic which monitors the application loading is capable of detecting an endpoint at which all the classes for a particular module have been downloaded. Accordingly, once this endpoint has been attained, the set or vector in which the classes have been recorded is complete. That is, once the final class of the module has been loaded the class graph for that module is complete. In one embodiment, the class graph is stored on a networked source server. The method of FIG. 11 is repeated for the next module until all the modules, representing all the feature functionality or tasks of the application, are loaded. As discussed above, each feature functionality or task may be downloaded on demand from a user, as a predictive download or in a methodical background download. It should be appreciated that once the core module is loaded the application may begin running so that a user can execute the functionality offered by the core module.

Figure 12A:
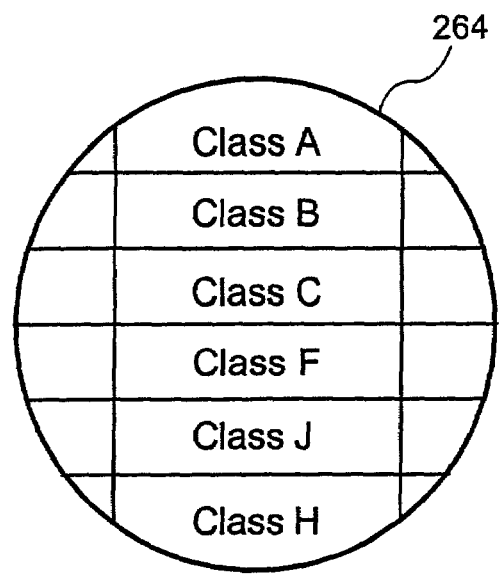
FIG. 12A illustrates a block diagram providing an exemplary illustration of a list of classes making up the modules of an application in accordance with one embodiment of the invention.
Figure 12A:
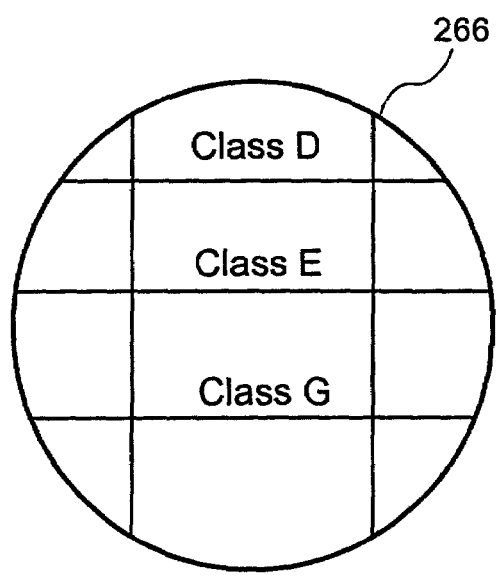

FIG. 12A illustrates a block diagram providing an exemplary illustration of a list of classes making up the modules of an application in accordance with one embodiment of the invention. Module 1 264 includes classes A, B, C, F, J and H while module 2 266 includes classes D, E and G. It should be appreciated that module 1 264 can represent the core module of an application, while module 2 266 represents some feature functionality in one embodiment. Taken even further, in terms of the greeting card example above, the core module 264 includes all the classes necessary for running an engine of the greeting card application and module 2 266 includes the classes necessary for a feature functionality or task, where the feature or task can be printing, editing, rotating, inserting text, etc. While only two modules are shown in FIG. 12B, the application can be subdivided into any number of modules.

Figure 12B:
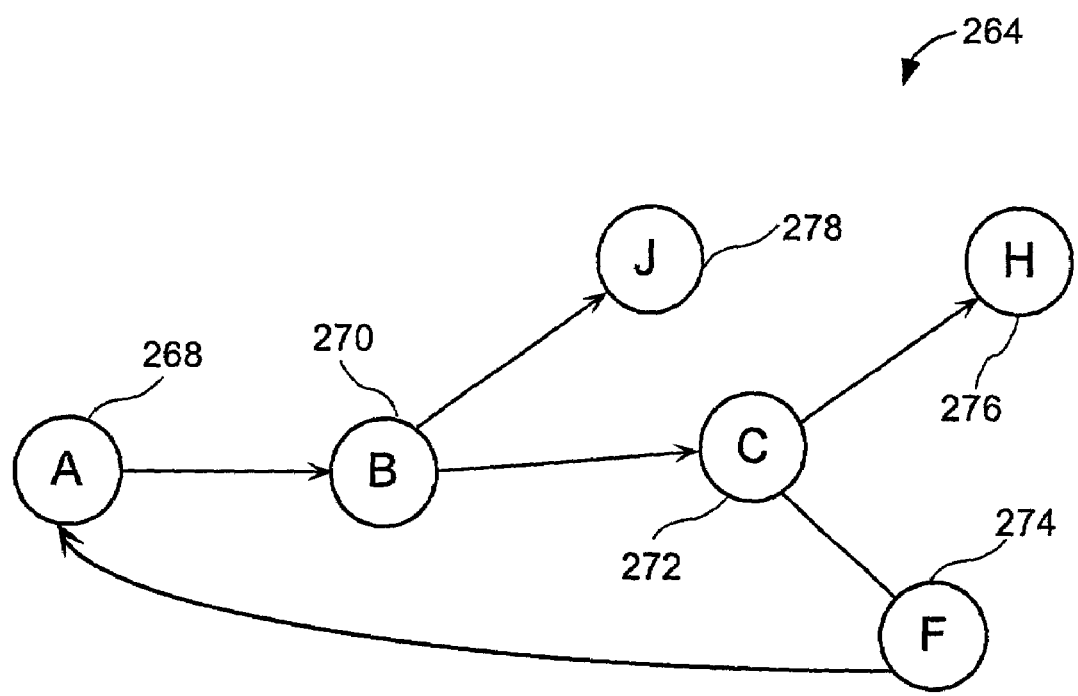
FIG. 12B illustrates an exemplary class graph of module 1 of FIG. 12A in accordance with one embodiment of the invention.

FIG. 12B illustrates an exemplary class graph of module 1 264 of FIG. 12A in accordance with one embodiment of the invention. As represented in FIG. 12B class A 268 is interrelated to class B 270 which in turn is interrelated to class C 272 and class J 278 and so on. In one embodiment, once all the classes of module 1 264 have been loaded and recorded, a class graph embodied as a map on the networked source server is created. The map is created on the fly as every feature of the application is executed while being monitored and recorded by the monitoring tool. In one embodiment, the recorded modules are stored on a storage medium in communication with the server. The server then looks at each file and creates a data structure, i.e. a map. In a preferred embodiment, the modules are stored as zip files where each module is associated with a zip file. The server then looks at each zip file and creates a data structure. As a result, a class graph is generated for each module as the program is being run, rather than the laborious task of analyzing the code manually. The class graph can then be utilized when downloading the application, as described above with respect to FIGS. 7–10.

In one embodiment, the modules can contain classes, images, text files, code required by the classes such as dynamic link libraries (DLLs), string resources or other enabling presentation features needed by the classes.

FIG. 13 illustrates an exemplary partial output of the monitoring program as an application is being executed in accordance with one embodiment of the invention. As is displayed in FIG. 13 multiple classes are recorded as they are being loaded. It should be appreciated that in addition to the class files, Graphics Interchange Format (GIF) files are also included in the modules. While the GIF files are configured to display various graphic images for the application it is possible that other graphic file formats, such as Joint Photographic Experts Group (JPEG), Tagged Image File Format (TIFF), etc. may be used in place of GIF file formats in another embodiment. The illustrative output displayed in FIG. 13 is repeated for each feature function of the application. If the application was just being started in FIG. 13, then the monitoring would capture the core module. As each feature of the application is used a module is created and an output similar to FIG. 13 can be generated for each module in one embodiment.

FIG. 14 illustrates a partial list of exemplary classes and GIF files for the core module from a greeting card application captured by the monitoring program in accordance with one embodiment of the invention. As illustrated in FIG. 14, a number of files are included in the core module for this application. Following along these lines, one would appreciate the monumental task at hand to manually parse through the code to determine the interrelations among the classes for an application. While FIGS. 13 and 14 provide exemplary illustrations of the output of the monitoring tool they are not meant to be limiting in any way. Again, it should be understood that a greeting card application is only used as an illustration and is not meant to be limiting in any way as the application may be any type of application enabling execution by one or more processing entities.

Once all the feature functionality employed by the application has been monitored and recorded it is possible that a class or multiple classes are common to multiple modules. In one embodiment, the duplicate class or classes may be placed in one module while the remaining modules are provided with links to the module containing the needed class or classes. In another embodiment, duplicate class or classes are included with the core module, since the core module is downloaded first and thus the common classes would always be available. In yet another embodiment, the common classes are moved to a common module which can be accessed by the modules needing the classes of the common module. The embodiments of the present invention allow for a plethora of possibilities in how the modules of any downloadable application can be configured in order to efficiently download the application over a distributed network such as the Internet.

While the above described invention has been described in the general context of an application program that is executed on an operating system in conjunction with a personal computer, it should be appreciated that the invention may be implemented with other routines, programs, components, data structures, etc. which perform particular tasks or implement particular abstract data types. Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. As mentioned above, while the application program is discussed in some of the embodiments with reference to a printer application, the application may be any type of application that enables processing by one or more processing entities. Accordingly, the present embodiments are to be considered as illustrative and not restrictive, and the invention is not to be limited to the details given herein, but may be modified within the scope and equivalents of the appended claims.

The invention claimed is:

1. A computer implemented method for identifying modules of an executable program, comprising:
   initiating the executable program; and
   monitoring the executable program as the executable program is running, the monitoring further including;
   identifying a core module providing a software engine of said executable program;
   identifying autonomous function modules, each corresponding to an optional function of the executable program not available in said core module;
   identifying interrelated classes used during execution of each of said modules, wherein the full functionality of said executable program is defined by a cumulative contribution of all of said modules; and subdividing said executable program into said core module and said autonomous function modules.

2. The method as recited in claim 1, further including generating a data structure for each module as the executable program is running, the data structure defining the classes for each module.

3. The method as recited in claim 1, wherein the monitoring the executable program further includes:
recording the interrelated classes in a set and generating a data structure for each module; and
storing the data structure.

4. The method as recited in claim 3, wherein the data structure is stored on a networked source server.

5. The method as recited in claim 1, wherein the monitoring the executable program further includes:
combining the classes common to two or more modules into a separate module.

6. A method for creating class graphs, the class graphs identifying how modules of an executable program use classes of the executable program, the method comprising:
monitoring the executable program as the program is being run;
identifying each class associated with a core module, the core module configured to run an engine of the program;
executing each task associated with the program while the program is being monitored;
identifying task functions not part of said core module, and separating each of said task functions into separate autonomous modules, wherein the full functionality of said executable program is defined by a cumulative contribution of all of said modules;
recording each class used in the execution of each task and associating each identified class with the task's corresponding module;
subdividing said executable program into said core module and said autonomous modules; and
defining a class graph for the core module and each autonomous module, wherein each class graph defines a class interaction within the core module and each autonomous module.

7. The method as recited in claim 6, wherein the executing each task further includes:
requesting each class associated with the each task.

8. The method as recited in claim 7, wherein the requested class is loaded from a file system.

9. The method as recited in claim 6, wherein the executable program is a printing application.

10. A method for subdividing an executable program comprising:
executing the program;
monitoring the execution of the program;
identifying a core module providing a software engine of said executable program;
identifying autonomous function modules, each corresponding to an optional function of the executable program not available in said core module;
maintaining a record of classes used during execution of each task within each module; and
defining a class graph for each of the modules, the class graph representing an interaction of classes associated with each of the modules.

11. The method as recited in claim 10, wherein the maintaining a record of classes further includes:
loading the classes through a class loader;
recording the loaded classes; and
returning the classes to a Virtual Machine.

12. The method as recited in claim 11, further including:
detecting an endpoint at which all the classes for each of the modules has been loaded.

13. The method as recited in claim 10, wherein each optional function is a selectable option within said core module but not executable within said core module, and wherein.

14. The method as recited in claim 10, wherein the record of classes of each task is stored in as a zip file.

15. The method as recited in claim 10, wherein each module is associated with a zip file.

16. The method as recited in claim 13, wherein the maintaining a record of classes used during execution of each task further includes:
identifying classes common to multiple modules; and
locating the identified classes common to multiple modules in the core module.

17. A method for developing a software product for an application, the application having a plurality of features, wherein each of the features is associated with at least one class, the method comprising:
identifying each class of the application;
executing each of the features of the application;
identifying each class associated with each of the features and collecting the identified classes associated with each feature into separate autonomous function modules; wherein each function module is operable to execute its associated feature;
subdividing the application into said autonomous function modules, wherein the full functionality of said executable program is defined by a cumulative contribution of all of said modules.

18. The method as recited in claim 17, wherein one module is a core module containing a main class with an entry point for the application.

19. The method as recited in claim 17, wherein defining a module for each of the features further includes:
storing each class for the module in a set.

20. The method as recited in claim 19, wherein the modules are stored as separate zip files on a networked source server, the zip files configured to be individually downloaded over a network upon a request from a Virtual Machine.

21. The method as recited in claim 20, wherein the downloading over a network is initiated by one of on demand from a user, a predictive download and a methodical background download.

22. A method for generating a autonomous module for partial functionality of an application program, the method comprising:
initiating the application program;
selecting a functional task for execution;
requesting a class loader to load classes associated with said functional task;
monitoring the class loader to identify each class loaded for execution of said functional task;
collecting all identified classes into said autonomous module;
recording each class of the autonomous module;
detecting an endpoint at which all the classes associated with the functional task have been loaded and included in said autonomous module; and establishing said autonomous module as a stand alone functional module for execution of the selected functional task.

23. The method as recited in claim 22, wherein a Virtual Machine requests the class loader.

24. The method as recited in claim 22, wherein each class of the module is recorded in one of a class and a vector.

25. The method as recited in claim 22, further including: returning the recorded class to a Virtual Machine.

26. The method as recited in claim 22, wherein the application program provides functionality for a printer.

27. A computer storage medium having program instructions for creating class graphs, the class graphs identifying how modules of an executable program use classes of the executable program, the computer readable media comprising:

program instructions for monitoring the executable program as the program is being run;

program instructions for identifying each class associated with a core module, the core module configured to run an engine of the program;

program instructions for executing each task associated with the program while the program is being monitored;

program instructions for recording each class used in the execution of each task and collecting the recorded classes into autonomous function modules corresponding to separate ones of each task associated with the program and not available in said core module; and program instructions for defining a class graph for the core module and each autonomous functional module, wherein each class graph defines a class interaction within the core module and each autonomous functional module.

28. The computer storage medium as recited in claim 27, wherein the program instructions for recording each class further includes:

program instruction for detecting an endpoint at which all the classes for the core module have been loaded.

29. The computer storage medium as recited in claim 27, wherein the full functionality of said executable program is defined by a cumulative contribution of all of said modules; and said computer readable media further including:

program instructions for generating a subdivided representation of said executable program, wherein the subdivided representation consists of a collection of said core module and said autonomous function modules.

30. The computer storage medium as recited in claim 29, wherein the core module and the autonomous function modules are independently downloadable over a distributed network.

* * * * *